US008605712B1

United States Patent
Eslambolchi et al.

(10) Patent No.: US 8,605,712 B1
(45) Date of Patent: Dec. 10, 2013

(54) METHOD AND APPARATUS FOR DISTRIBUTING VIDEO WITH OFFLOAD ENGINE

(75) Inventors: Hossein Eslambolchi, Los Altos Hills, CA (US); Mostafa Tofighbakhsh, Cupertino, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1515 days.

(21) Appl. No.: 11/284,017

(22) Filed: Nov. 21, 2005

(51) Int. Cl.
*H04L 12/28* (2006.01)
(52) U.S. Cl.
USPC .......................................... 370/352; 709/232
(58) Field of Classification Search
None
See application file for complete search history.

(56) References Cited

U.S. PATENT DOCUMENTS

| 6,002,441 | A | * | 12/1999 | Bheda et al. | 375/240.26 |
| 6,011,499 | A | * | 1/2000 | Agarwal et al. | 341/67 |
| 7,523,179 | B1 | * | 4/2009 | Chu et al. | 709/222 |
| 2004/0073716 | A1 | * | 4/2004 | Boom et al. | 709/250 |
| 2004/0087326 | A1 | * | 5/2004 | Dunko et al. | 455/517 |
| 2005/0021871 | A1 | * | 1/2005 | Georgiou et al. | 709/250 |
| 2005/0188055 | A1 | * | 8/2005 | Saletore | 709/218 |
| 2005/0188074 | A1 | * | 8/2005 | Voruganti et al. | 709/224 |
| 2006/0171689 | A1 | * | 8/2006 | Smith | 386/125 |

* cited by examiner

*Primary Examiner* — Luat Phung

(57) ABSTRACT

A method and apparatus for enabling video distribution with a transport layer protocol offload engine are disclosed. The present invention provides a transport layer protocol offload engine-enabled NIC card with capabilities to classify the received packets, process transport layer protocols, and process the video packets directly on the NIC card.

18 Claims, 4 Drawing Sheets

METHOD AND APPARATUS FOR DISTRIBUTING VIDEO WITH OFFLOAD ENGINE

The present invention relates generally to communication networks and, more particularly, to a method and apparatus for enabling video distribution with an offload engine, e.g., a Transmission Control Protocol (TCP) offload engine over Internet Protocol (IP) networks.

BACKGROUND OF THE INVENTION

The Internet has emerged as a critical communication infrastructure, carrying traffic for a wide range of important scientific, business and consumer applications. Since Internet services are becoming ubiquitous, more and more customers are using their Internet connections for voice and data services. However, a typical broadcast quality video transport service uses either a Hybrid Fiber Coax (HFC) cable or a satellite distribution system. This is mainly due to the fact that video transport requires much more bandwidth. For example, a coaxial cable can deliver 100 channels each at 50 Mbps. The main disadvantages of the traditional architectures for video distribution are the fact that the communication is unidirectional, the bandwidth is dedicated for video services and a set-top box is required at each receiver location.

The unidirectional nature prevents the service provider from being able to deliver interactive services such as video on demand on the traditional infrastructure. Since the bandwidth is not shared with other services, the infrastructure is costly. The consumer also has to rent or buy a set-top box to access the video broadcast services.

Another alternative is to use the IP infrastructure for all voice, data and video services. The main challenge is that broadcast video is a highly demanding application for the receiving device such as the computer. The CPU has to dedicate a large portion of the processing power to handle video broadcast. Furthermore, other receiving devices such as cellular phones may have Internet access but not the processing power for broadcast video applications.

Therefore, there is a need for a method and apparatus that would enable the service provider to transport video services over the same infrastructure used for voice and data transport, and simultaneously allow the consumer to receive the broadcast video without dedicating a significant portion of the CPU resources for the video processing application.

SUMMARY OF THE INVENTION

In one embodiment, the present invention discloses a method and apparatus for enabling video distribution with an offload engine, e.g., a TCP offload engine over an IP network. For example, the present invention enables the receiving device to offload the TCP and video processing capabilities to the network interface card. The network interface card has capabilities to classify received packets, to process TCP protocols, and to process the video packets directly on the card in a module specifically designed to handle video signals. The packets associated with the video application are processed directly on the network interface card while other packets are forwarded to the host CPU. This allows optimizing the module for processing video packets for performance parameters such as processing speed.

Therefore, the present method enables the customer or subscriber to receive the broadcast using any device with the network interface card. Thus, the consumer is not required to utilize the processor of a high-end computer to process the video packets. For example, the network interface card can be implemented on devices such as cellular phones or Personal Digital Assistants (PDAs).

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

It should be noted that although the present invention is described below in terms of TCP, the present invention is not so limited. Namely, other transport layer protocol, e.g., User Datagram Protocol (UDP) and the like, can be implemented in accordance with the present invention.

Figure 1:
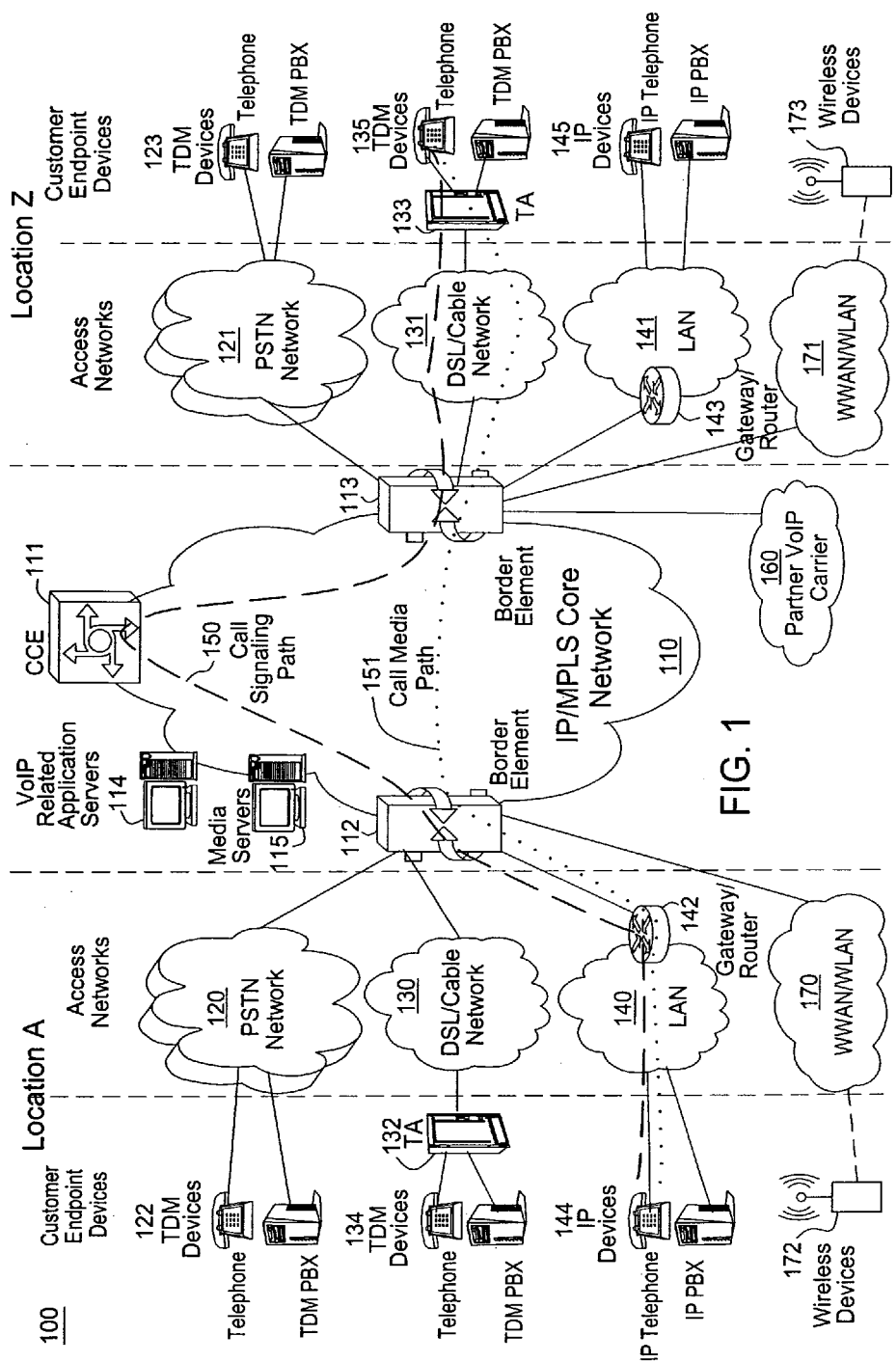
FIG. 1 illustrates an exemplary network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based, IP based or wireless such as cellular phones. TDM based customer endpoint devices 122, 123, 134, and 135 typically comprise of TDM phones or Private Branch Exchange (PBX). IP based customer endpoint devices 144 and 145 typically comprise IP phones or IP PBX. Wireless endpoint devices 172 and 173 typically comprise cellular phones, pocket PCs etc. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively. Wireless endpoint devices access VoIP services by using a Wireless Local Area Network (WLAN) or a Wireless Wide Area Network (WWAN). The WLAN/WWAN network is connected to the IP core network through the border elements 112 and 113.

The access networks for wired devices can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices. The access network for wireless devices can be WLAN, WWAN or an integrated WLAN/WWAN network.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which video broadcast packets can be transported to customers. Since Internet services are becoming ubiquitous, more and more customers are using their Internet connections for voice and data services. However, video broadcast services have been transported mainly using coaxial cable or satellite transport networks. The main disadvantages of the traditional architectures for video distribution are the fact that the communication is unidirectional, the bandwidth is dedicated for video services and a set-top box is required at each receiver location.

To address this criticality, the present invention uses the IP infrastructure for all voice, data and video services. One challenge is that broadcast video is a highly demanding application for the receiving device such as a computer. The Central Processing Unit (CPU) has to dedicate a large portion of the processing power to handle video broadcast. Furthermore, other receiving devices such as cellular phones may have Internet access but not the processing power for broadcast video applications.

However, service providers recognize the fact that the IP infrastructure is intended for bi-directional communication and is a good fit for services that require interaction with the customers such as video on demand. In turn, the customers would like to access the broadcast without a set-top box or a computer with a large processing power. Hence, both service providers and consumers benefit from using the same infrastructure for all voice, data and video transport needs.

In order to clearly illustrate the present invention, the following IP network related concepts will first be described. These concepts are that of:

Central Processing Unit (CPU);

Network Interface Card (NIC);
Transmission Control Protocol over Internet Protocol (TCP/IP);
Three-Way Handshake; and
TCP Offload Engine (TOE).

Central Processing Unit (CPU) is the part of a computer where the majority of the calculations are made and instructions are executed. Namely, the CPU is the part of a computer that includes the circuits that control the interpretation and execution of instructions and the performing of mathematical operations.

Network Interface Card (NIC) is a physical card used to connect a computer to a network. A NIC contains hardware to support certain network types such as Ethernet, token ring etc. Computers and smart devices employ the NIC cards to connect to the network.

The Internet is the worldwide computer network available for the public to exchange data by packet switching using the standardized Internet Protocol (IP). Transmission Control Protocol over Internet Protocol (TCP/IP) is a transport layer protocol that runs over Internet protocol that is used to create a virtual connection between two end points. The virtual connection is used to transmit packets between the two end point devices while ensuring that the packets arrived at the destination. Thus, if packets are lost, then they are retransmitted. The virtual connection is setup using the Three-Way handshake described below.

In one embodiment, the TCP packet has a header composed of 32-bit words for providing the source port, destination port, control flags etc. The control flag portion includes URGent (URG), ACKnowledgement (ACK), PuSH (PSH), ReSeT (RST), SYNchronize (SYN) and FINish (FIN). If a particular bit is set to "1" the flag is "on" and if the bit is set to "0" the flag is "off."

Three-Way handshake is a method used to establish a virtual connection containing the following three steps:
  Transmission of a Synchronize (SYN) packet from the device initiating the communication to the targeted device;
  Transmission of Synchronize/Acknowledgement (SYN/ACK) packet from the targeted device back to the source of the SYN message; and
  Transmission of Acknowledgement (ACK) packet from the device that initiated the communication to the destination device.

In one embodiment, the SYN packet is a TCP packet with only the SYN flag set to "on" and it is used to initiate the three-way handshake. The SYN/ACK packet is a TCP packet with the SYN and ACK flags set to "on" and it is used in response to a received SYN packet. The ACK packet is a TCP packet with only the ACK flag set to "on" and it is sent by the network element that initiated the three-way handshake to complete the connection.

For example, if a client node needs to transmit a packet to a server, then it initiates the three-way handshake by sending a SYN packet. The server responds with a SYN/ACK packet. The client node receives the SYN/ACK packet and responds to the server with an ACK packet.

The other packets are transmitted only after the TCP handshake is completed. The receiving device then needs to associate the packets as they arrive with an open TCP connection.

For video broadcast service, the service provider acquires the video signals from several sources such as satellite, live recording etc. and uses standards based video codec to compress and encapsulate the data prior to transmission. Some examples of video codecs are Motion Picture Experts Group-2 (MPEG-2), MPEG-4, Audio Video Interleave (AVI) etc. The encoded packets are encapsulated with TCP/IP overhead and transmitted over the IP network after the TCP handshake is completed.

At the receiver end of the transmission, when packets are received from the network, the NIC copies the packets to the NIC buffers. The NIC then notifies the host system using interrupts. The NIC then copies the packets to the TCP buffers. The CPU then processes and associates the packets with an open TCP connection. The TCP verifies that the packets are error free and then the TCP data is correlated with an application. The CPU then copies the data to the memory location used by the application. The TCP verifies the integrity of each packet and sends an acknowledgement. The CPU receives and processes the interrupt for each TCP operation.

A TCP Offload Engine (TOE) (broadly defined as a transport layer protocol offload engine) is an application and/or hardware that is located on the NIC card and is dedicated to handle TCP/IP network traffic. As packets arrive to a TOE enabled NIC card, the NIC card processes the TCP/IP protocol translation and copies the packets to the memory location used by the relevant application. The application performs the decoding of the incoming packets and streams the video to a display device.

In one embodiment, the present invention discloses a method and apparatus for enabling video distribution with TCP offload engine over the IP network. For example, the present invention provides a TOE enabled NIC card with capabilities to classify the received packets, process TCP protocol translations, and process the video packets directly on the NIC card. Namely, the video packets are processed in a module specifically designed to handle video signals. Packets for other applications are simply copied to memory locations used by the other applications.

Therefore, the present method enables the customer to receive the broadcast using any device with the present NIC card. Thus, the consumer is not required to utilize a high-end computer, but instead may purchase a TOE enabled NIC card, module, or chip set to upgrade an existing computer to receive video packets more efficiently over an IP network. For example, the network interface card, module or chip set can be implemented on other devices such as PDAs, and cellular phones.

Figure 2:
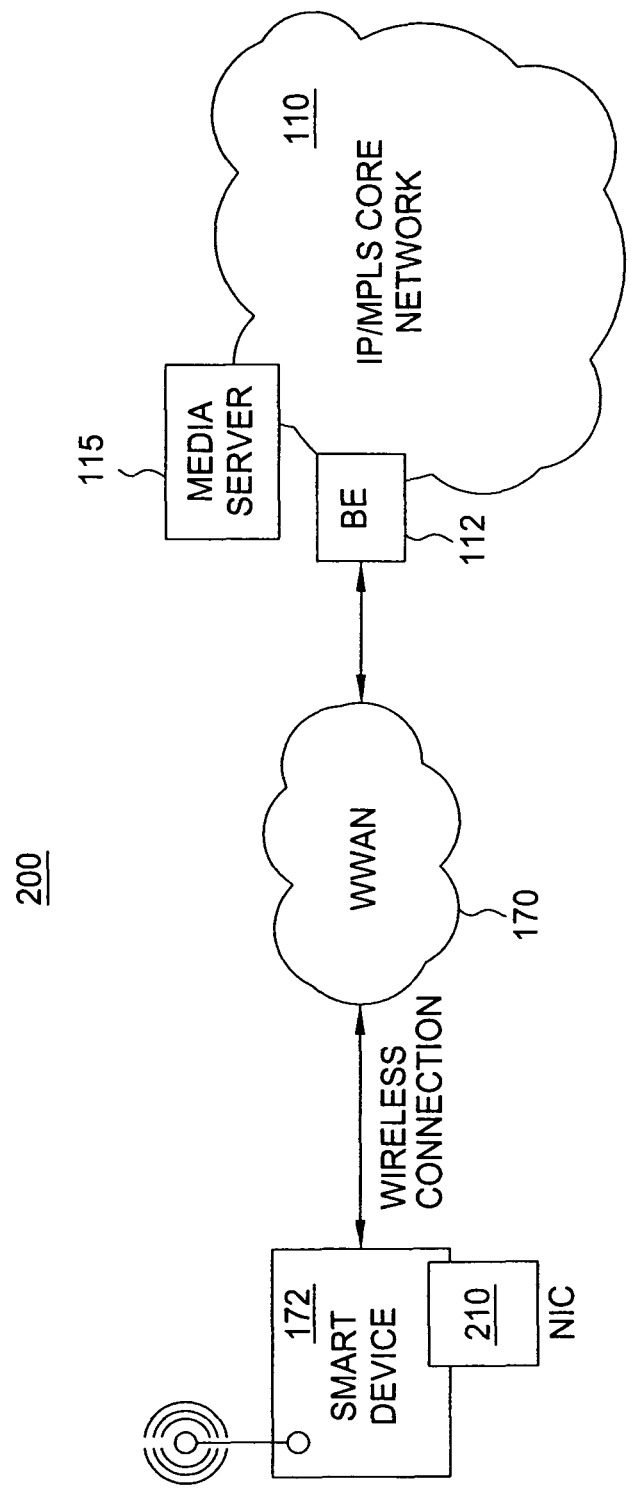
FIG. 2 illustrates a smart device receiving broadcast video from a service provider over the internet.

FIG. 2 illustrates an example 200 of a smart device receiving broadcast video from a service provider over the Internet. The smart device 172 (e.g., a computer, a laptop computer, a cellular phone, or a personal digital assistant (PDA) has TOE enabled NIC card 210 with capabilities to classify the received packets, process TCP protocol translation, and process the video packets directly on the card. The customer with the wireless smart device 172 may initiate the media session with the multimedia server 115 through the WWAN network 170.

The TCP handshake occurs between the smart device and the media server and then the connection is made. The video packets are transmitted to the smart device only after the connection is established. When the packets arrive at the network interface, the NIC classifies the data and identifies the packets associated with an open TCP connection. The NIC then processes the TCP protocol and determines whether the packets are for video application. If the application is not video, it simply copies the packets to the memory used by the specific application. If the application is video, the NIC processes the packets to decode the signal and stream the video data directly to a display device. Thus, the video codec is implemented on the NIC card and the CPU for the smart device is not significantly used in the reception and the processing of the video data received over the IP network. The connection is terminated when the customer ends the media session.

Figure 3:
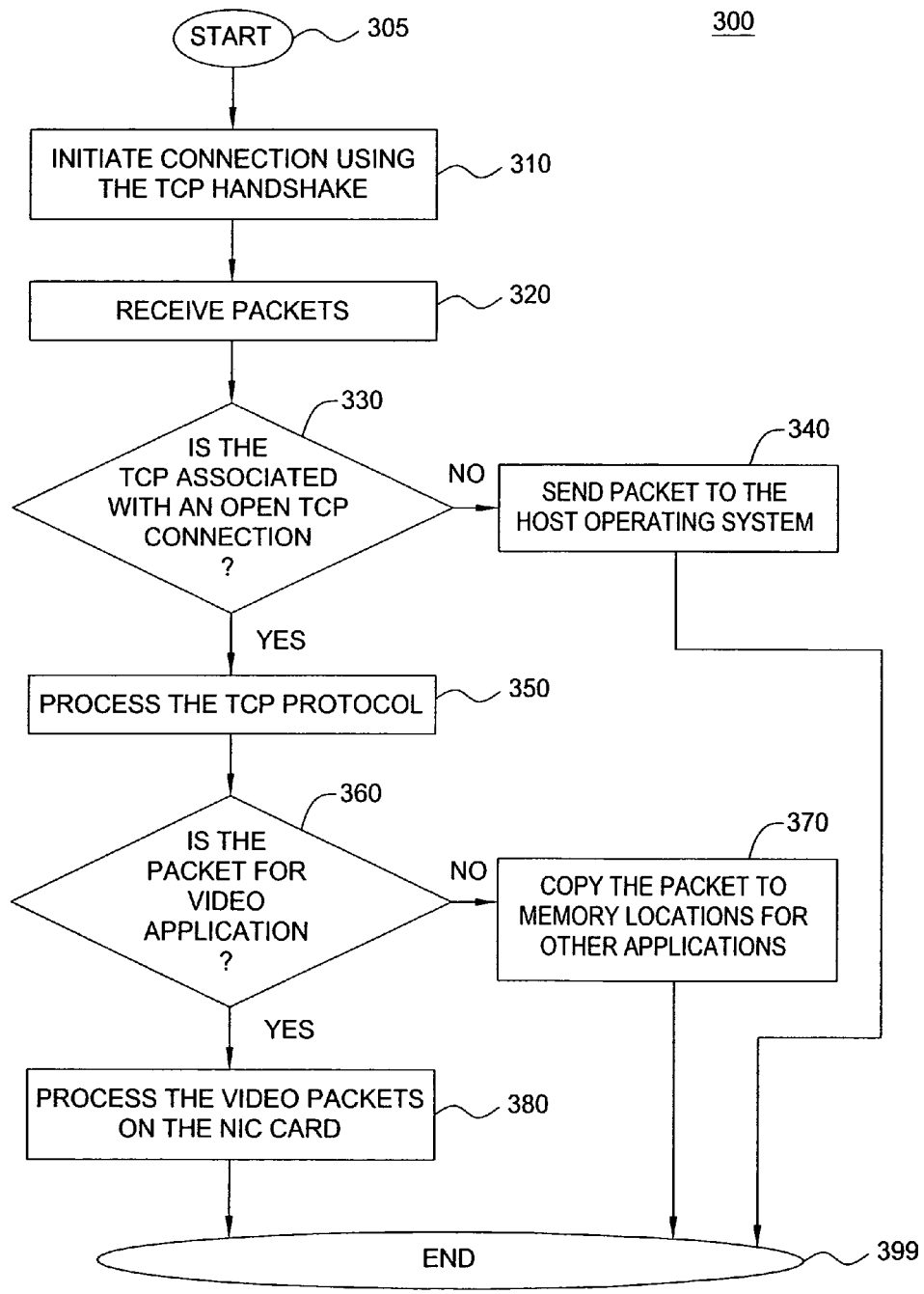
FIG. 3 illustrates a flowchart of a method for receiving Video broadcast with a TCP offload engine.

FIG. 3 illustrates a flowchart of an exemplary method 300 for receiving video broadcast with TCP offload engine. Method 300 starts in step 305 and proceeds to step 310.

In step 310, method 300 initiates connection (a transport layer protocol connection) to a broadcast server (e.g., a media server) via a TCP handshake. The connection is established and the smart device is ready to receive the packets when the handshake is completed. The method then proceeds to step 320.

In step 320, method 300 receives the packets. The smart device is using a TOE enabled NIC to connect to the network. Therefore, the packets are received by the NIC and stored in the NIC memory. The NIC then proceeds to step 330 to classify the packets and identify the packets associated with an open TCP connection.

In step 330, method 300 classifies the packets in the NIC memory and determines whether the packets are associated with an open TCP connection. If a packet is not associated with an open TCP connection, the method proceeds to step 340. If the packet is associated with an open TCP connection, the method proceeds to step 350 to process the TCP protocol.

In step 340, method 300 copies the packets to the CPU memory (e.g., to the main operating system) and proceeds to step 399 to end processing the current packet.

In step 350, method 300 processes the TCP protocol translation. For example, the processing may include verifying the integrity of the received packets in accordance with TCP protocol. If packets are lost or corrupted, they are retransmitted and placed in the correct order. The method then proceeds to step 360.

In step 360, method 300 determines whether the packet was for a video application. If the packet is for another application, the method proceeds to step 370 to copy the packets to the memory associated with the other application. If the packet is for the video application, the method proceeds to step 380.

In step 370, method 300 copies the packets for other applications to the appropriate memory location.

In step 380, method 300 processes the video packets directly on the NIC. The processing may include decoding, streaming, etc. For example, if a MPEG-4 encoder was used by the transmission end, then the NIC will decode the MPEG-4 encoded signal and streams it to a display device so that the customer can view the video. The method then end in step 399.

Figure 4:
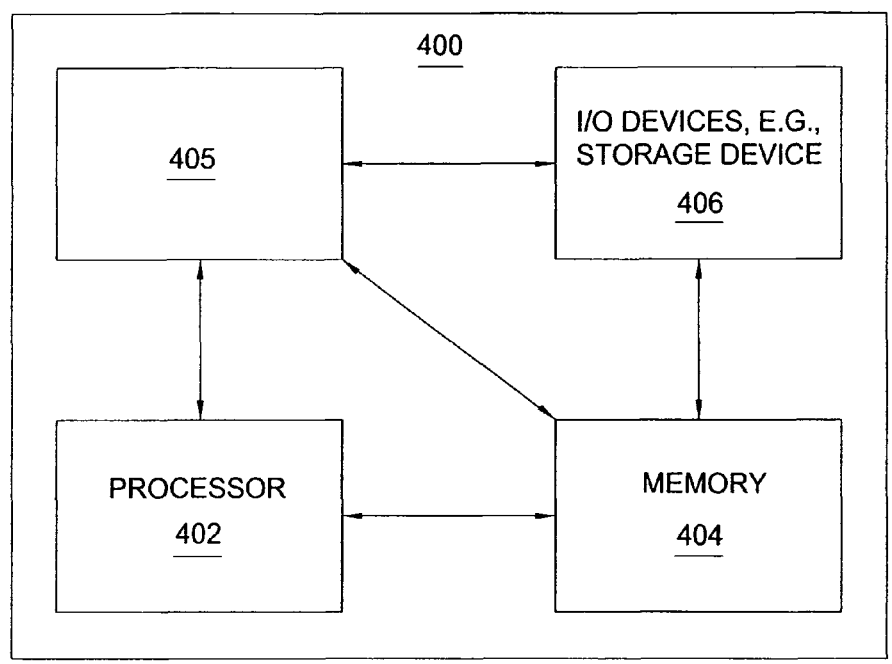
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 with a TCP offload engine, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 with a TCP offload engine can be loaded into memory 404 and executed by processor 402 to implement the functions as discussed above. As such, the present method 405 for a TCP offload engine (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for receiving a plurality of packets from an internet protocol communication network, comprising:

receiving the plurality of packets at an end point device having a transport layer protocol offload engine via a transport layer protocol connection with the internet protocol communication network; and decoding a plurality of video packets comprising a motion compensation encoded video signal from the plurality of packets directly using the transport layer protocol offload engine, forwarding the plurality of video packets that is decoded directly to a display device using the transport layer protocol offload engine, wherein the end point device employs a central processing unit, wherein the decoding of the plurality of video packets from the plurality of packets is performed independent of the central processing unit, wherein the decoding performs a decoding of the motion compensation encoded video signal, wherein the end point device is a cellular phone, wherein the cellular phone comprises a mobile end point device.

2. The method of claim 1, wherein the internet protocol communication network is a voice over internet protocol network.

3. The method of claim 1, wherein the plurality of packets is received wirelessly by the end point device.

4. The method of claim 1, wherein the transport layer protocol connection comprises a transmission control protocol connection.

5. The method of claim 1, wherein the transport layer protocol offload engine is implemented on a network interface card.

6. The method of claim 1, wherein the transport layer protocol connection comprises a user datagram protocol connection.

7. The method of claim 1, wherein the transport layer protocol offload engine is implemented on a network interface module.

8. The method of claim 1, wherein the transport layer protocol offload engine is implemented on a network interface chip set.

9. A non-transitory computer-readable medium storing a plurality of instructions which, when executed by an end point device, cause the end point device to perform operations for receiving a plurality of packets from an internet protocol communication network, the operations comprising:

receiving the plurality of packets at the end point device having a transport layer protocol offload engine via a transport layer protocol connection with the internet protocol communication network; and decoding a plurality of video packets comprising a motion compensation encoded video signal from the plurality of packets directly using the transport layer protocol offload engine, forwarding the plurality of video packets that is decoded directly to a display device using the transport layer protocol offload engine, wherein the end point device employs a central processing unit, wherein the decoding of the plurality of video packets from the plurality of packets is performed independent of the central processing unit, wherein the decoding performs a decoding of the motion compensation encoded video signal, wherein the end point device is a cellular phone, wherein the cellular phone comprises a mobile end point device.

10. The non-transitory computer-readable medium of claim 9, wherein the internet protocol communication network is a voice over internet protocol network.

11. The non-transitory computer-readable medium of claim 9, wherein the plurality of packets is received wirelessly by the end point device.

12. The non-transitory computer-readable medium of claim 9, wherein the transport layer protocol connection comprises a transmission control protocol connection.

13. The non-transitory computer-readable medium of claim 9, wherein the transport layer protocol offload engine is implemented on a network interface card.

14. The non-transitory computer-readable medium of claim 9, wherein the transport layer protocol connection comprises a user datagram protocol connection.

15. An end point device for receiving a plurality of packets from an internet protocol communication network, comprising:

a central processing unit; and a network interface card that comprises a transport layer protocol offload engine for receiving the plurality of packets via a transport layer protocol connection with the internet protocol communication network, for decoding a plurality of video packets comprising a motion compensation encoded video signal from the plurality of packets directly, and for forwarding the plurality of video packets that is decoded directly to a display device, wherein the decoding of the plurality of video packets from the plurality of packets is performed independent of the central processing unit, wherein the decoding performs a decoding of the motion compensation encoded video signal, wherein the end point device is a cellular phone, wherein the cellular phone comprises a mobile end point device.

16. The end point device of claim 15, wherein the internet protocol communication network is a voice over internet protocol network.

17. The end point device of claim 15, wherein the plurality of packets is received wirelessly by the end point device.

18. The end point device of claim 15, wherein the transport layer protocol connection comprises a transmission control protocol connection.

* * * * *